United States Patent [19]

Carpenter

[11] Patent Number: 4,928,986
[45] Date of Patent: May 29, 1990

[54] ARM AND LEG POWERED CYCLE
[75] Inventor: Paul R. Carpenter, Lakewood, Colo.
[73] Assignee: P. D. Enterprises, Inc., Lakewood, Colo.
[21] Appl. No.: 190,927
[22] Filed: May 6, 1988
[51] Int. Cl.⁵ .............................................. B62M 1/12
[52] U.S. Cl. ..................... 280/234; 280/240; 280/241
[58] Field of Search ............... 280/233, 234, 240, 241, 280/242.1, 244, 249, 250; 272/73, 74

[56] References Cited

U.S. PATENT DOCUMENTS

| | | | |
|---|---|---|---|
| 1,020,432 | 3/1912 | McBarnes | 280/234 |
| 3,760,905 | 9/1973 | Dower | 280/233 |
| 4,508,358 | 4/1985 | Erel | 280/234 |
| 4,541,647 | 9/1985 | Braun | 280/234 |

FOREIGN PATENT DOCUMENTS 800011 10/1978 U.S.S.R. .
1065279 1/1984 U.S.S.R. .

*Primary Examiner*—Charles A. Marmor
*Assistant Examiner*—Richard Camby
*Attorney, Agent, or Firm*—Douglass F. Vincent

[57] ABSTRACT

An arm and leg powered cycle using a linear reciprocating motion of arm and leg drive members to provide power. An elongated bicycle chassis has a forward and a rear wheel, a seat with a back rest for the operator, and lower and central support members. The arm drive member includes a rotatably mounted housing in which a plunger linearly reciprocates when an operator "rows" the plunger, using handlebars attached thereto. Pulling on the arm plunger tightens a cable attached at one end to the plunger and at the other end to a chain engaging sprocket, the sprocket being constrained to rotation in one direction by a one-way dog. The chain engaging sprocket engages a drive chain on the pulling or "drive" stroke, thereby pulling the chain through the stroke. This motion is transferred to drive the rear wheel through a series of gears and a transmission chain. Pushing on the leg drive member creates a drive stroke of the same type, also providing power to the drive chain. The arms and legs may be used either jointly or independently to power the vehicle. Steering is accomplished by shaping the arm plunger and the associated housing sheath so as to allow linear reciprocation but not rotation relative to one another. Thus, tilting of the handlebars rotates the drive housing which through a series of gears, turns a steering fork on which the front wheel is mounted, thereby steering the cycle.

9 Claims, 3 Drawing Sheets

ARM AND LEG POWERED CYCLE

TECHNICAL FIELD

This invention relates to arm and leg powered cycles, and more particularly to a cycle powered by linear reciprocating "rowing" motions of the arms and legs. The cycle may be used solely for exercise or may also be used for transportation.

BACKGROUND OF THE INVENTION

Numerous variations of bicycles and tricycles are known in the prior art, and generally provide excellent exercise and transportation. However, these vehicles typically have used only the operator's legs to provide power. This exclusive reliance on leg power reduces the potential exercise benefits which could be obtained by utilizing both the arms and the legs to provide power. Similarly, utilizing the power of the arms to supplement that provided by the legs could allow greater speeds to be achieved and maintained. In addition, persons without the use of their legs, and who would not be able to use a conventional leg-powered cycle, could nonetheless operate a vehicle which utilized arm power.

Several cycles utilizing both arm and leg power are known in the prior art One example is shown in U.S. Pat. No. 1,020,432 to McBarnes, which discloses a bicycle powered by a linear reciprocating motion of the arms and legs. However, the McBarnes cycle requires simultaneous use of the arms and legs, which deprives the operator of the option of choosing an optimum combination of arm and leg usage. In addition, such a device would not be suitable for persons handicapped in the use of their legs. A similar problem would result with the Soviet Union Patent No. 800,011, which also requires simultaneous use of the arms and legs. Various attempts have been made to solve this problem, but the solutions have often required cumbersome and heavy equipment. In addition, the prior art configurations have also sometimes rendered operation of the vehicle awkward, and in particular have had less than optimum results with steering the vehicles. Examples of vehicles which permit the arms and legs to be used jointly or independently are shown in U.S. Pat. Nos. 3,760,905 to Dower and 4,508,358 to Erel. Further examples of background art may be seen in U.S. Pat. No. 4,541,647 to Braun and Soviet Union Patent No. 1,065,279.

SUMMARY OF THE INVENTION

In accordance with the present invention, an arm and leg powered cycle is provided for use by an operator for exercise or transportation or both. The cycle includes a chassis in the form of an elongated conventional bicycle chassis, and having a lower support member extending from the front to the rear of the cycle and a center support member extending upward from the lower support member. A seat having a back rest is provided for the operator, with the seat being attached to the lower support member and located to the rear of the center support member. A rear wheel is adapted to be driven, and a steerable front wheel has a steering fork onto which the wheel is mounted.

An upper drive plunger linearly reciprocates in a housing extending from the center support member to the steering fork above the front wheel. Handlebars extend transversely from the plunger and are held by the operator, who uses his arms to execute a linear reciprocating or "rowing" motion of the upper drive plunger. The pulling or "drive" stroke portion of the rowing motion tightens a cable attached to a chain engaging sprocket which is constrained to a single direction of rotation by a one-way dog. The sprocket engages a drive chain on the drive stroke, thereby moving the chain with the stroke. The drive chain transmits this power through a series of gears and a transmission chain to drive the rear wheel and propel the cycle forward. On the return stroke, a return spring pulls the chain engaging member back into position for another drive stroke. The cycle is thus capable of being powered solely with the arms.

In addition, a similar structure allows power to be supplied using the legs, either jointly with or independently of the arms. A lower drive plunger has pedals for the operator's feet and is pushed with the legs on the drive stroke. Power from this stroke is transferred to the drive chain in the same manner as with the upper drive plunger, using a cable to pull a drive engaging sprocket and thereby pull the chain. This power is added to the power already transferred to the drive chain by the upper drive plunger, and is then transferred to the rear wheel.

Steering of the cycle is accomplished through a linkage from the handlebars through the upper drive plunger housing to the steering fork. To effectuate this, the plunger housing is rotatably mounted to the chassis, preferably by brackets having bushings therein. The plunger has a multilateral cross-section, preferably rectangular, which is matched in shape by a slightly larger sheath defined by the plunger housing. This allows the plunger to linearly reciprocate within the sheath, but precludes rotation of the plunger relative to the sheath. Therefore, when the plunger is rotated by tilting the handlebars, the entire plunger housing rotates in its brackets. This rotation is transferred to the steering fork through a series of bevel gears, thus turning the front wheel and allowing the vehicle to be steered.

In this way, an easily operated arm and leg powered cycle is provided which requires a minimum of parts and is thus light weight. The arms and legs may be used together or separately to power the vehicle. This allows the operator to choose any combination of arm and leg power to drive the cycle, and is of particular benefit to persons having impaired use of the arms or legs.

Additional advantages of this invention will become readily apparent from the description which follows, together with the accompanying drawings.

DESCRIPTION OF THE PREFERRED EMBODIMENT

Figure 1:
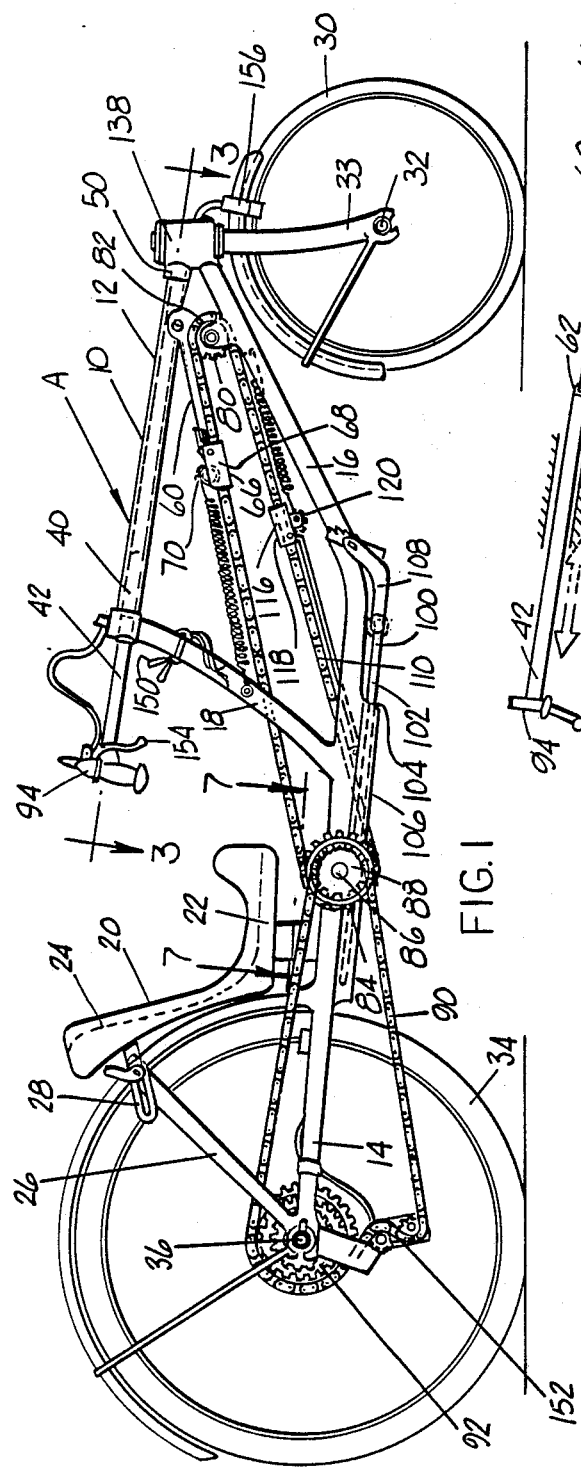
FIG. 1 is a perspective view of the arm and leg powered cycle of the present invention.

Referring now to the drawings, FIG. 1 shows an arm and leg powered cycle A in accordance with the present invention. The cycle A includes a chassis 10 having a forward end 12 and a rear end 14. The chassis 10 resembles an elongated standard bicycle chassis, and may be made from any suitable bicycle chassis material. The chassis 10 is somewhat longer than a standard bicycle chassis to accommodate the more horizontal pumping actions associated with the present invention. Lower support member 16 extends from the rear end 14 to the forward end 12 and provides most of the support for the cycle A. Center support member 18 extends upward from lower support member 16, and further serves to support operation of the cycle. Lower support member 16 is located in front of an operator seat 20 which is itself attached to the lower support member 16. For best results, the seat 20 should have a base portion 22 upon which the operator sits, and a back rest portion 24 to support the operator's back. The back rest 24 is important to successful operation of the cycle A because horizontal pumping will result in horizontal forces on the operator which may best be absorbed by the back rest 24. The back rest 24 should be of rigid construction and may be supported by optional back rest support strut 26 extending from the lower support member 16 and attaching to back rest 24 by bracket 28.

Forward wheel 30 is rotatably mounted near the forward end 12 on forward wheel axle 32 which is secured in steering fork 33. In similar fashion, rear wheel 34 is rotatably mounted on rear wheel axle 36 near the rear 14 of the chassis 10. As will be discussed in further detail, forward wheel 30 is steerable to guide the vehicle, while rear wheel 34 is adapted to receive power to drive the vehicle.

Figure 3:
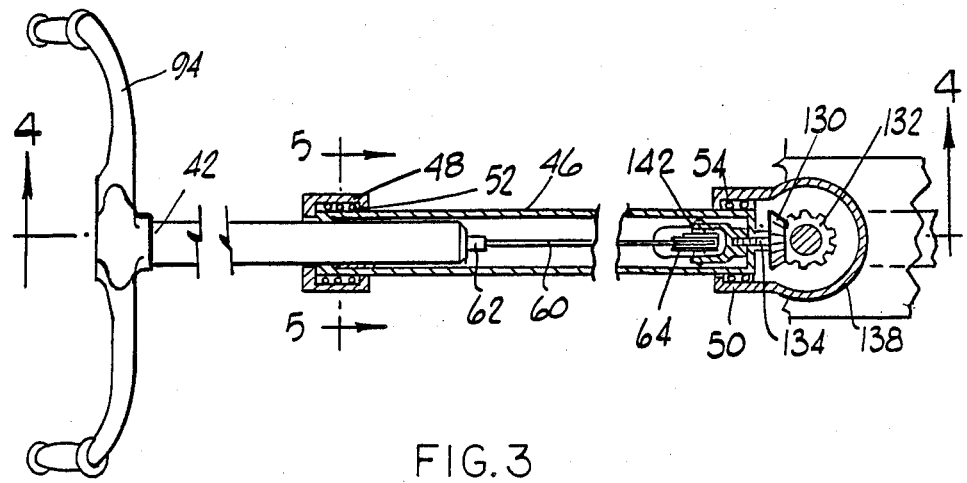
FIG. 3 is a partially broken top cross-sectional view taken along line 3—3 of FIG. 1, showing the upper drive member and steering mechanism.
Figure 4:
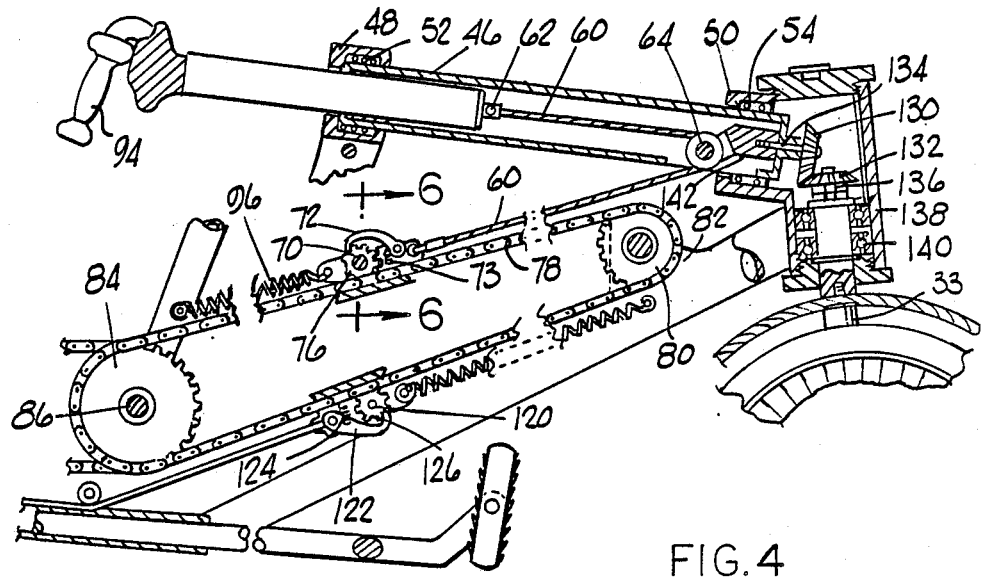
FIG. 4 is a partially broken cross-sectional view taken along line 4—4 of FIG. 3, showing the interaction of the drive members with their associated cables and chain engaging sprockets.
Figure 5:
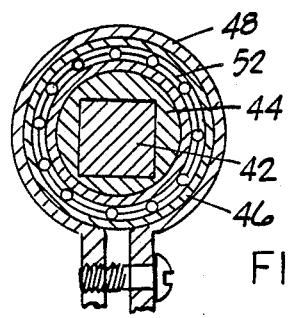
FIG. 5 is a cross-sectional view taken along line 5—5 of FIG. 3 showing the interaction of the upper drive plunger with the drive plunger housing, and showing the rotatable mounting of the housing in its bracket.
Figure 6:
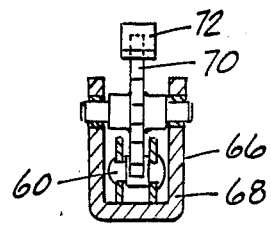
FIG. 6 is a cross-sectional view taken along line 6—6 of FIG. 4 showing the operation of the chain engaging sprocket and the dog.

Referring now to FIGS. 3–5, the details of the steering and arm power functions are shown. An upper drive member 40 includes a plunger 42 capable of linearly reciprocating within a sheath 44 defined by upper drive member housing 46. The plunger 42 has a rectangular cross-sectional shape, as best seen in FIG. 5. The sheath 44 will have an identical shape of just slightly larger dimensions than the plunger 42 to allow for the plunger 42 to move longitudinally therein. Drive member housing 46 is supported and held in place by housing brackets 48 and 50. Housing brackets 48 and 50 have bushings 52 and 54 which allow the housing 46 to rotate relative to the brackets 48 and 50. As will be discussed in detail later, this rotation of the drive member housing 46 may be transferred to the forward wheel 30 to steer the vehicle.

Figure 8:
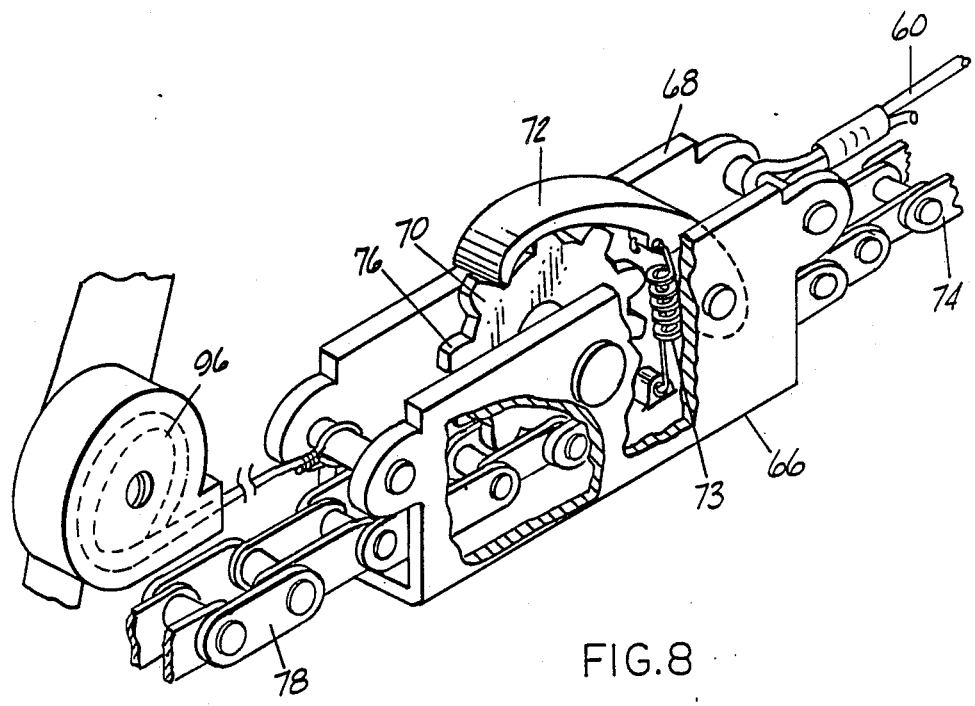
FIG. 8 is a partially cut away close up view of the chain engaging mechanism in interaction with the chain and the return spring.

Upper drive cable 60 is attached at one end to plunger 42 by cable mount 62. The cable 60 extends forward from the plunger 42 and passes over swivel pulley 64, from where it extends rearward and connects to chain engaging member 66. As best seen in FIG. 8, chain engaging member 66 includes a housing 68 which contains chain engaging sprocket 70 and one-way dog 72 biased by spring 73. Drive chain 74 passes through housing 68 and is engaged by sprocket teeth 76, which fall between lengths 78 of the chain 74.

Figure 7:
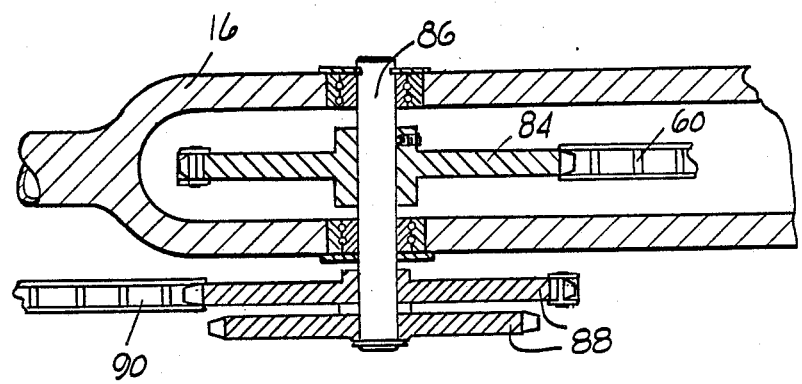
FIG. 7 is a cross-sectional view taken along line 7—7 of FIG. 1 showing the drive axle, drive gears and transmission gears.

Endless drive chain 74 is slung around free wheeling sprocket 80 which is mounted to the chassis by, mounting bracket 82. Drive chain 74 extends rearward and is further slung around drive gear 84 which is mounted on drive axle 86, as best seen in FIG. 7. Transmission gears 88 are also mounted on drive axle 86. An endless transmission chain 90 is slung around a selected one of the transmission gears 88 and extends rearward to be slung at its other end around rear wheel gears 92, which are mounted on rear axle 36. While any suitable combination of transmission and rear wheel gears may be used, a conventional 10-speed arrangement of gears is shown.

In operation, the vehicle operator holds the handlebars 94 which extend outward from upper drive member plunger 42. By alternatively pushing and pulling the plunger 42 in a rowing-type motion, the operator generates power which is transmitted to the rear wheel 34 to drive the vehicle. The power and motion cycle thus generated is shown schematically in FIG. 2. Drive power and motion are generated by a drive stroke from a pulling action on the handlebars 94, as shown by solid arrows in FIG. 2. The return stroke occurs when the handlebars are pushed, and motion thus created is illustrated by dashed arrows in FIG. 2.

On the drive stroke, the cable 60 is tightened by the pulling action of the plunger 42, thus pulling the chain engaging member 66. The chain engaging sprocket teeth 76 then engage drive chain 74, while one-way dog 72 prevents sprocket 70 from rotating during the drive stroke. The pulling motion of the cable 60 is thus transferred directly to the drive chain 74 throughout the drive stroke. This motion of the drive chain 74 rotates drive gear 84, which indirectly drives the rear wheel 34 through interaction with the transmission gears 88, transmission chain 90, and rear wheel gears 92.

Upon completion of the drive stroke, the return stroke is begun by pushing on the handlebars 94 and the tension on the cable 60 is thereby released. This allows return spring 96 to return chain engaging member 66 to a ready position for the next drive stroke. Return spring 96 may be of the coil-type, or a reel-type spring may be used as shown in FIG. 8. Very little tension is required from spring 96 to return the chain engaging member 66 to a ready position on the return stroke, as the now rotating sprocket 70 allows the member 66 to move relatively freely in the return direction. Once the return stroke is completed, a new drive stroke may be begun, and this cycle may be repeated indefinitely. From this discussion, it is apparent that the cycle may be driven entirely by the arms if so desired.

Referring now to FIGS. 1 through 4, a similar operation is illustrated for producing power with the legs, using a linear reciprocating motion of lower drive member 100. Lower drive member 100 includes a plunger 102 for linearly reciprocating within a sheath 104 defined by the lower drive member housing 106. The sheath 104 should be identical in cross-sectional shape to the plunger 102, and of slightly larger dimensions to allow for longitudinal movement of the plunger 102 therein. Drive member housing 106 is connected to the lower support member 16. The drive member 100 has a pedal portion 108 at the forward end for pushing action by the operator's feet. Optional stirrups (not shown)

may be provided to allow a pulling action by the operator's feet.

Lower drive cable 110 is attached at one end to plunger 102 by cable mount 111. The cable 110 extends rearward from the plunger 102 and passes over pulley 112. From the pulley 112 the cable extends forward over position roller 114 and connects to chain engaging member 116. Chain engaging member 116 is essentially identical in form and function to chain engaging member 66, as best illustrated in FIG. 8. The parts of chain engaging member 116 include member housing 118, sprocket 120, one-way dog 122, bias spring 124 and sprocket teeth 126.

Figure 2:
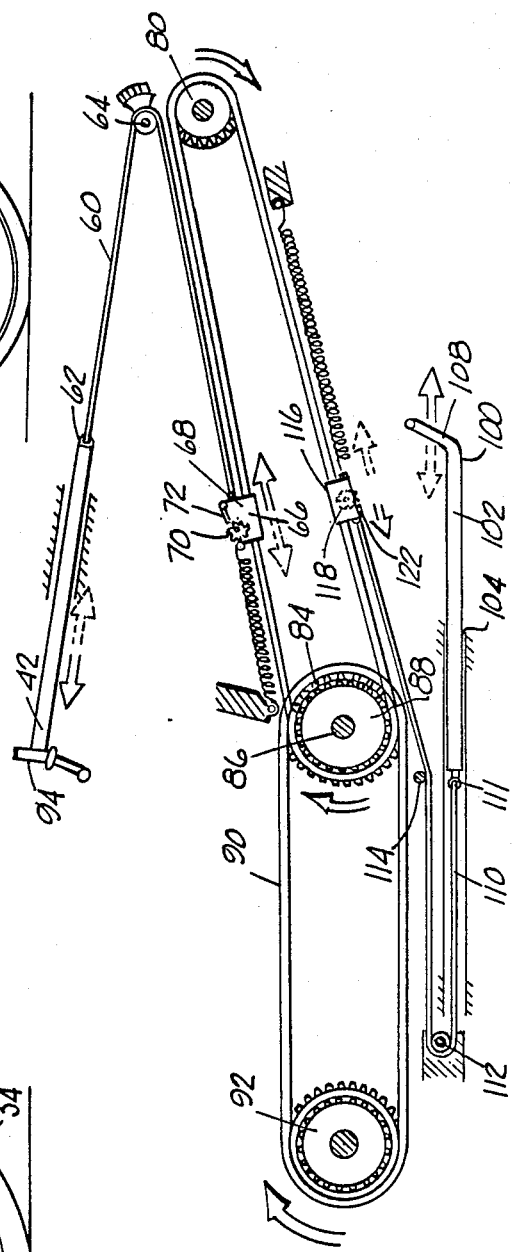
FIG. 2 is a schematic view showing the drive train of the invention.

Operation of the lower drive member 100 by the operator's feet is analogous to operation of the upper drive member 40 using the arms. A schematic representation of the power cycle associated with the lower drive member 100 is illustrated in FIG. 2. As before, the drive actions are indicated by solid arrows, while the return actions are indicated by the dashed arrows. The drive stroke is generated by the operator pushing on pedals 108 with his feet. This motion exerts a pulling force on the drive cable 110 which in turn pulls on the chain engaging member 116. This causes the drive chain 74 to move through the drive stroke as was described above in the discussion of the operation of the upper drive member. As also discussed earlier, this motion of the drive chain 74 is transferred to the drive axle 86 and from there through the transmission gears 88 and transmission chain 90 to the rear wheel gears 92, thereby driving the cycle A forward.

From the foregoing it is apparent that the legs may be used to power the vehicle independently of the arms. The arms and legs may also be used jointly to provide power with excellent results. A simultaneous pulling with the arms and pushing with the legs will transmit the sum of the power generated by the two strokes directly to the rear wheel, less the efficiency losses inherent in the system. In addition, there is efficiency to be gained by the nature of the simultaneous opposing actions of the arms and legs, which takes advantage of the natural tendency of the operator to pull with the arms when pushing with the legs.

Referring now to FIGS. 1 and 3-5, the structure for steering the vehicle is illustrated. As discussed previously, upper drive plunger 42 is of a shape and size relative to plunger sheath 44 to allow linear reciprocation of the plunger 42 in the sheath 44, but to preclude rotation of the plunger 42 therein. As the drive member housing 46 is rotatably mounted in brackets 48, 50, any rotation of the plunger 42 will be transferred directly into an equal rotation of the housing 46. Such a rotation may be easily effected by the operator turning the handlebars 94. This rotation will then be transferred through a series of meshing bevel gears 130 and 132 to the steering fork 33, thereby turning front wheel 30 and steering the cycle A. Upper bevel gear 130 is fixedly mounted to drive member housing 46 by any suitable mounting, such as mounting pin 134. In similar fashion, steering fork bevel gear 132 is fixedly mounted to steering fork 33 as by mounting pin 136. Steering fork 33 is rotatably mounted in steering housing 138 on bushings 140. Steering housing 138 additionally helps to protect the steering gears 130, 132 from dirt and moisture. To avoid excess torsional strain on drive cable 60 during turning, pulley fork 142 is integrally mounted to housing 46 and causes pulley 64 to rotate equally with plunger 42 and cable 60, thereby keeping their relative orientation constant. This allows for smoother cooperation of the cable 60 and pulley 64.

To operate the cycle A, the operator sits in the seat 20 with his feet on the pedals 108 and his hands on the handlebars 94. He then executes pushing and pulling strokes as described above to power the vehicle. The arms or legs may be used independently or one another, or they may be used jointly in any combination. The operator steers with the handlebars 94 in the conventional way, and may steer the vehicle equally well regardless of the position of the plunger 102 in its stroke. Gear shifting is accomplished in the way well known with ten-speed bicycles, and gear shift levers 150 and derailleur 152 are provided for this purpose. Braking is also accomplished in the manner of conventional bicycles, using brake levers 154 and brake pads 156 for this purpose.

This invention has been described in detail with reference to a particular embodiment thereof, but it will be understood that various other modifications can be effected within the spirit and scope of this invention.

I claim:

1. An arm and leg-powered cycle apparatus, comprising:
   a chassis having a forward end and a rear end and having a seat for an operator;
   an upper drive member on said chassis forward of said seat, said upper drive member linearly reciprocating through a drive stroke and a return stroks;
   a lower drive member on said chassis below said upper drive member and forward of said seat, said lower drive member linearly reciprocating through a drive stroke and a return stroke;
   a forward wheel and a rear wheel, each wheel rotatably mounted on said chassis;
   gear means connected to said rear wheel for receiving power to drive said rear wheel;
   drive gear means on said chassis spaced from and forward of said rear wheel gear means;
   an endless transmission chain slung between said rear wheel gear means and said drive gear means for transmitting motion from said drive gear member to said rear wheel;
   a freewheeling sprocket on said chassis forward of said drive gear means;
   an endless drive chain slung between said sprocket and said drive gear means; and
   one-way chain engaging means connected to said drive members for transmitting the linear motion of said upper and lower drive strokes to said drive chain to drive said rear wheel.

2. Apparatus as claimed in claim 1, wherein said means for transmitting the linear motion of said drive strokes to said drive chain includes:
   an upper cable attached at one end to said upper drive member and at the other end to a first one-way chain engaging means, and a lower cable attached in like fashion to said lower drive member and a second one-way chain engaging means, said chain engaging means engaging said drive chain when pulled by the associated drive member cable during said drive stroke, for pulling said chain in a single rotational direction; and
   biasing means attached to said first and second chain engaging means to slidably return said chain engaging means to ready positions during said return strokes.

3. Apparatus as claimed in claim 1, further including:

a housing in which said upper drive member is linearly reciprocable;

bracket means on said chassis for rotatably mounting said housing;

means for rotating said drive member housing; and means for transmitting said housing rotation to the forward wheel to steer said wheel.

4. Apparatus as claimed in claim 3, wherein:

said drive member is shaped as an elongated plunger having a multilateral end cross-section; and said drive member housing defines an elongated sheath having an end cross-section of like shape and slightly larger than said plunger cross-section to allow for said linear reciprocation of said plunger in said sheath, and having sufficiently tight fit with said plunger to preclude rotational movement of said plunger relative to said sheath.

5. Apparatus as claimed in claim 4, wherein said means for rotating said drive member housing includes:

two handle bars extending transversely from said upper drive member so that rotation of said handle bars rotates said upper drive member, causing a corresponding rotation of said drive member housing within said bracket means, said housing rotation taking place independently of said linear motion of said drive member.

6. An arm and leg-powered cycle apparatus, comprising:

a chassis having a forward end and a rear end and having a seat for an operator;

an upper drive member on said chassis forward of said seat, said upper drive member linearly reciprocating through a drive stroke and a return stroke;

a lower drive member on said chassis below said upper drive member and forward of said seat, said lower drive member linearly reciprocating through a drive stroke and a return stroke;

a forward wheel and a rear wheel, each wheel rotatably mounted on said chassis;

gear means connected to said rear wheel for receiving power to drive said wheel;

drive gear means on said chassis spaced from and forward of said rear wheel gear means;

an endless transmission chain slung between said rear wheel gear means and said drive gear means for transmitting motion from said drive gear member to said rear wheel;

a freewheeling sprocket on said chassis forward of said drive gear means;

an endless drive chain sling between said sprocket and said drive gear means;

an upper cable attached at one end to said upper drive member and at the other end to a first one-way chain engaging means, and a lower cable attached in like fashion to said lower drive member and a second one-way chain engaging means, said chain engaging means engaging said drive chain when pulled by the associated drive member cable during said drive stroke, for pulling said chain in a single rotational direction; and biasing means attached to said first and second chain engaging means to slidably return said chain engaging means to ready positions during said return strokes.

7. Apparatus as claimed in claim 6, further including:

a housing in which said upper drive member is linearly reciprocable;

bracket means on said chassis for rotatably mounting said housing;

means for rotating said drive member housing; and means for transmitting said housing rotation to the forward wheel to steer said wheel.

8. Apparatus as claimed in claim 7, wherein:

said drive member is shaped as an elongated plunger having a multilateral end cross-section; and said drive member housing defines an elongated sheath having an end cross-section of like shape and slightly larger than said plunger cross-section to allow for said linear reciprocation of said plunger in said sheath, and having sufficiently tight fit with said plunger to preclude rotational movement of said plunger relative to said sheath.

9. Apparatus as claimed in claim 8, wherein said means for rotating said drive member housing includes:

two handle bars extending transversely from said upper drive member so that rotation of said handle bars rotates said upper drive member, causing a corresponding rotation of said drive member housing within said bracket means, said housing rotation taking place independently of said linear motion of said drive member.

* * * * *